(12) United States Patent
Whiting et al.

(10) Patent No.: US 10,347,136 B2
(45) Date of Patent: Jul. 9, 2019

(54) AIR TRAFFIC COMMUNICATION

(71) Applicant: Wing Aviation LLC, Mountain View, CA (US)

(72) Inventors: Gregory Whiting, Menlo Park, CA (US); James Burgess, Redwood City, CA (US); Chirath Thouppuarachchi, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 2 days.

(21) Appl. No.: 15/390,255

(22) Filed: Dec. 23, 2016

(65) Prior Publication Data

US 2019/0156681 A1    May 23, 2019

(51) Int. Cl.
  *G08G 5/00* (2006.01)
  *H04B 7/185* (2006.01)

(52) U.S. Cl.
  CPC ......... *G08G 5/0008* (2013.01); *G08G 5/0021* (2013.01); *H04B 7/18506* (2013.01)

(58) Field of Classification Search
  CPC . G08G 5/0008; G08G 5/0021; H04B 7/18506
  See application file for complete search history.

(56) References Cited

U.S. PATENT DOCUMENTS

| 5,441,217 A * | 8/1995 | Novinger | B64F 1/36 244/114 R |
|---|---|---|---|
| 6,282,417 B1 | 8/2001 | Ward | |

(Continued)

FOREIGN PATENT DOCUMENTS

| WO | 0003366 A1 | 1/2000 |
|---|---|---|
| WO | 2015102921 A1 | 7/2015 |

OTHER PUBLICATIONS

"New aviation communications system ready for take-off", Oct. 13, 2014, https://ec.europa.eu/programmes/horizon2020/en/news/new-aviation-communications-system-ready-take, 2 pages.

(Continued)

*Primary Examiner* — Behrang Badii
*Assistant Examiner* — Daniel L Greene
(74) *Attorney, Agent, or Firm* — Christensen O'Connor Johnson Kindness PLLC

(57) ABSTRACT

Apparatus and methods related to autonomous aerial communications are included. A computing device can detect data associated with relevant events, determine information related to the event that should be communicated and a target aerial vehicle for that information, identify one or more operational parameters of the target aerial vehicle, and, based on those operational parameters, select a language associated with the target aerial vehicle, and generate and transmit a message expressing that information in the selected language to the target aerial vehicle. In a further aspect, a computing device can detect data associated with relevant events, determine information related to the event that should be communicated and a target recipient for that information, identify one or more operational parameters of the target recipient, and, based on those operational parameters, select a language associated with those operational parameters, and generate and transmit a message expressing that information in the selected language to the target recipient.

20 Claims, 8 Drawing Sheets

(56) References Cited

U.S. PATENT DOCUMENTS

| | | | |
|---|---|---|---|
| 6,992,626 | B2 | 1/2006 | Smith |
| 7,689,423 | B2 | 3/2010 | Bicego et al. |
| 8,751,061 | B2 | 6/2014 | Coulmeau et al. |
| 8,849,476 | B2 | 9/2014 | Coulmeau |
| 9,401,758 | B2 | 6/2016 | Bosworth |
| 2002/0123913 | A1* | 9/2002 | Butterly ............... G06Q 10/025 705/6 |
| 2003/0093187 | A1* | 5/2003 | Walker ................... B64C 13/20 701/1 |
| 2003/0222795 | A1* | 12/2003 | Holforty ................ B64D 43/00 340/968 |
| 2009/0182549 | A1* | 7/2009 | Anisimovich ...... G06F 17/2755 704/4 |
| 2011/0161073 | A1 | 6/2011 | Lesher et al. |
| 2011/0245997 | A1 | 10/2011 | Marty et al. |
| 2014/0018979 | A1 | 1/2014 | Goossen et al. |
| 2015/0321758 | A1 | 11/2015 | Sama, II |
| 2015/0362917 | A1 | 12/2015 | Wang et al. |
| 2015/0365159 | A1 | 12/2015 | Bosworth |
| 2016/0012730 | A1 | 1/2016 | Jarrell |
| 2016/0125744 | A1* | 5/2016 | Shamasundar ...... G08G 5/0039 701/122 |
| 2016/0140851 | A1* | 5/2016 | Levy .................... G08G 5/0069 701/3 |
| 2016/0163204 | A1 | 6/2016 | Raptopoulos et al. |
| 2016/0165661 | A1 | 6/2016 | Worley, III et al. |
| 2016/0300495 | A1 | 10/2016 | Kantor et al. |
| 2017/0069214 | A1 | 3/2017 | Dupray |
| 2018/0027382 | A1* | 1/2018 | Taboso .................. H04W 4/029 370/312 |

OTHER PUBLICATIONS

Ken Hoke, "How Pilots Communicate In Other Countries", May 15, 2014, http://aerosavvy.com/how-pilots-communicate/, 5 pages.

Class Bravo Airspace, available online at: http://www.cfinotebook.net/notebook/national-airspace-system/class-bravo-airspace (last visited Nov. 3, 2016). 6 pages.

Class Charlie Airspace, available online at: http://www.cfinotebook.net/notebook/national-airspace-system/class-charlie-airspace (last visited Nov. 3, 2016) 5 pages.

Class Delta Airspace, available online at: http://www_cfinotebook.net/notebook/national-airspace-system/class-delta-airspace (last visited Nov. 3, 2016). 6 pages.

Class Echo Airspace, available online at: http://www_cfinotebook.net/notebook/national-airspace-system/class-echo-airspace (last visited Nov. 3, 2016). 5 pages.

Class Golf Airspace, available online at: http://www_cfinotebook.net/notebook/national-airspace-system/class-golf-airspace (last visited Nov. 3, 2016). 3 pages.

Class Alpha Airspace, available online at: http://www.cfinotebook.net/notebook/national-airspace-system/class-alpha-airspace [last visited Nov. 3, 2016]. 4 pages.

Los Angeles International Airport Airspace Overview, Appendix H, 14 CFR Part 150 Noise Exposure Map Report, May 2015, 16 pages.

Marcus, Ben, "Proposed FFA Small Uas Rule-What is Class B, C, D and E airspace?", available online at: https://medium.com/future-of-flight/proposed-faa-small-uas-rule-what-is-class-b-c-d-and-e-airspace-81e760a36dbl#.kndb956kp, Feb. 22, 2015, 9 pages.

Morgan, Tim, "What are pilots saying to air traffic controllers and what does it mean?", available online at: https://www.quora.com/What-are-pilots-saying-to-air-traffic-controllers-and-what-does-it-mean, May 28, 2014, 13 pages.

National Airspace System, available online at: http://www.cfinotebook.net/notebook/national-airspace-system/national-airspace-system (last visited Nov. 3, 2016) 5 pages.

Radio Communications, available online at: http://www.cfinotebook.net/notebook/air-traffic-control/radio=communications (last visited Nov. 3, 2016) 12 pages.

Rossier, Robert N., "Class B Basics: The ABCs of Class B Airspace", AVweb, available online at: http://www.avweb.com/news/avtraining/183284-1.html, Apr. 4, 1998, 6 pages.

Still, Russell, "Radio Communications in Class D Airspace", available online at: http://www.goldsealgroundschool.com/library/classd-radio14.pdf (last visited Mar. 15, 2017), 7 pages.

Todd, Scott C., "A Guide to Class Band C Operations", available online at: jttp://www.scottsasha.com/aviation/airspace/operations.html (last visited Oct. 31, 2016) 4 pages.

Todd, Scott C., "Radio Communications Handout", available online at: http://www.scottsasha.com/aviation/plans/commshandout.html (last visited Oct. 31, 2016) 7 pages.

U.S. Department of Transportation: Federal Aviation Administration, "Traffic Advisory Practices at Airports Without Operating Control Towers", Advisory Circular, May 21, 1990, 8 pages.

U.S. Department of Transportation: Federal Aviation Administration, "Recommended Standard Traffic Patterns and Practices for Aeronautical Operations at Airports Without Operating Control Towers", Advisory Circular, Aug. 26, 1993, 12 pages.

U.S. Department of Transportation: Federal Aviation Administration, "Aeronautical Information Manual", Dec. 10, 2015: Last update: May 26, 2016, 726 pages.

U.S. Department of Transportation: Federal Aviation Administration, "U.S. Airspace Classes at a Glance", Your Aviation Safety Website: https:/lwwwJaasafety_gov/, Feb. 2011. 2 pages.

U.S. Department of Transportation: Federal Aviation Administration, "Classes of Airspace: Types of Controlled airspace", available online at: https://www.faasafety.gov/gslac/ALC/course_content.aspx?cID=42&sID=505&preview=true (last visited Nov. 5, 2016) 4 pages.

U.S. Department of Transportation: Federal Aviation Administration, "Phases of Flight", available online at: https://www.faa.gov/nextgen/phasesoffligh/ (last visited Oct. 6, 2016) 3 pages.

U.S. Department of Transportation: Federal Aviation Administration, "Air Traffic Control", Dec. 10, 2015, 729 pages.

U.S. Department of Transportation: Federal Aviation Administration, Unmanned Aircraft Operations in the National Airspace System (NAS), Nov. 25, 2015, 18 pages.

Wikipedia, "Airspace class", available online at: https://en.wikipedia.org/wiki/Airspace_class (last visited Oct. 9, 2016) 10 pages.

Wikipedia, "National Airspace System", available online at: https://en.wikipedia.org/wiki/National_Airspace_system (last visited Oct. 6, 2016) 3 pages.

International Search Report and Written Opinion issued in International Application No. PCT/US2017/065080, dated Apr. 23, 2018, 9 pages.

* cited by examiner

810 Detect, by a control system of the aerial vehicle, data associated with an event 820 Determine, by the control system, that information related to the event should be communicated 830 Determine, by the control system, a target recipient for the information;

840 Identify, by the control system, one or more operational parameters of the target recipient, wherein the one or more operational parameters comprise at least one parameter indicative of whether the target recipient is human operated, computer operated, or both 850 Select, by the control system, from a plurality of available languages, a language associated with the target recipient, wherein the plurality of languages comprises at least one natural language associated with human-operated flight systems and at least one machine language associated with the computer-operated flight systems 860 Generate, by the control system, a message expressing the information related to the event in the language associated with the target recipient 870 Transmit, by the control system, the message to the target recipient

FIG. 8

AIR TRAFFIC COMMUNICATION

BACKGROUND

Aerial vehicles may be used to facilitate a number of functions. The aerial vehicle can take various forms, whether those forms are now known or later developed. One function of the aerial vehicle may include the transportation of cargo to a destination.

During transportation, the aerial vehicle may need to communicate with manned aerial vehicles, related legacy support system entities (e.g., a manned air-traffic controller station), unmanned aerial systems ("UASs"), and/or wholly or partially computer-automated air traffic control systems.

To facilitate this communication, various communication systems may be used by the aerial vehicle. The aerial vehicle's communication system can take various forms, whether those forms are now known or later developed. One type of aerial vehicle communication system may include an autonomous communication system for the aerial vehicle.

When a communication system operates in an autonomous mode, it may be advantageous for the system to send a message to an intended recipient in response to a detected event. It may also be advantageous for the intended recipient to be able to understand the message. Further, if some messages are sent to multiple intended recipients, then it may be advantageous for each intended recipient to understand the message.

Various types of autonomous communication systems may exist for various vehicles utilized in various different environments. For instance, autonomous communication systems may exist for vehicles operating in the air, on the ground, underwater, and in space. Other examples are also possible.

SUMMARY

Example embodiments may facilitate the use of autonomous communication between aerial vehicles, while also allowing an aerial vehicle to autonomously communicate with human-piloted aerial vehicles. In particular, the aerial vehicle's control system may detect an event, determine information pertaining to the aerial vehicle's operation which should be communicated, determine information that should be communicated based on the data associated with that event, and autonomously communicate that information to manned aerial vehicles, related legacy support system entities, unmanned aerial systems, and/or wholly or partially computer-automated air traffic control systems, in language that is understood by the recipient or recipients.

In one aspect, a method is provided. The method involves detecting, by a control system of the aerial vehicle, data associated with an event. The method also involves determining, by the control system, that information related to the event should be communicated. The method further involves determining, by the control system, a target aerial vehicle for the information. The method additionally involves identifying, by the control system, one or more operational parameters of the target aerial vehicle, wherein the one or more operational parameters comprise at least one parameter indicative of whether the target aerial vehicle is human operated, computer operated, or both. The method also involves selecting, by the control system, from a plurality of available languages, a language associated with the target aerial vehicle, wherein the plurality of languages comprises at least one natural language associated with human-operated target aerial vehicles and at least one machine language associated with the computer-operated target aerial vehicles. The method further involves generating, by the control system, a message expressing the information related to the event in the language associated with the target aerial vehicle. The method additionally involves transmitting, by the control system, the message to the target aerial vehicle.

In another aspect, a system is provided. The system includes at least one target aerial vehicle and at least one aerial vehicle with an autonomous aerial communications system, wherein the autonomous aerial communications system comprises at least one interface for communication with other aerial vehicles and a control system. The control system is configured to detect data associated with an event. The control system is also configured to determine that information related to the event should be communicated. The control system is further configured to determine the target aerial vehicle for receiving the information. The control system is additionally configured to identify one or more operational parameters of the target aerial vehicle, wherein at least one operational parameter indicates whether the target aerial vehicle is human operated, computer operated, or both. The control system is also configured to select, from a plurality of available languages, a language associated with the target aerial vehicle, wherein the plurality of languages comprises at least one natural language associated with human-operated target aerial vehicles and at least one machine language associated with the computer-operated target aerial vehicles. The control system is further configured to generate a message expressing the information related to the event in the language associated with the target aerial vehicle. The control system is additionally configured to transmit the message to the target aerial vehicle.

In yet another aspect, a non-transitory computer readable medium is provided. The non-transitory computer readable medium has stored therein instructions executable by one or more processors to cause a control system to perform functions. The functions include detecting data associated with an event. The functions also include determining that information related to the event should be communicated. The functions further include determining a target aerial vehicle for the information. The functions additionally include identifying one or more operational parameters of the target aerial vehicle, wherein the one or more operational parameters comprise at least one parameter indicative of whether the target aerial vehicle is human operated, computer operated, or both. The functions also include selecting from a plurality of available languages, a language associated with the target aerial vehicle, wherein the plurality of languages comprises at least one natural language associated with human-operated target aerial vehicles and at least one machine language associated with the computer-operated target aerial vehicles. The functions further include generating a message expressing the information related to the event in the language associated with the target aerial vehicle. The functions additionally include transmitting the message to the target aerial vehicle.

In yet another aspect, a method is provided. The method involves detecting, by a control system of the aerial vehicle, data associated with an event. The method also involves determining, by the control system, that information related to the event should be communicated. The method further involves determining, by the control system, a target recipient for the information. The method additionally involves identifying, by the control system, one or more operational parameters of the target recipient, wherein the one or more operational parameters comprise at least one parameter indicative of whether the target recipient is human operated, computer operated, or both. The method also involves selecting, by the control system, from a plurality of available languages, a language associated with the one or more identified operational parameters, wherein the plurality of languages comprises at least one natural language and at least one machine language. The method further involves generating, by the control system, a message expressing the information related to the event in the selected language. The method additionally involves transmitting, by the control system, the generated message.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 8 is a flowchart of a method, according to an example embodiment.

DETAILED DESCRIPTION

Figure 1:
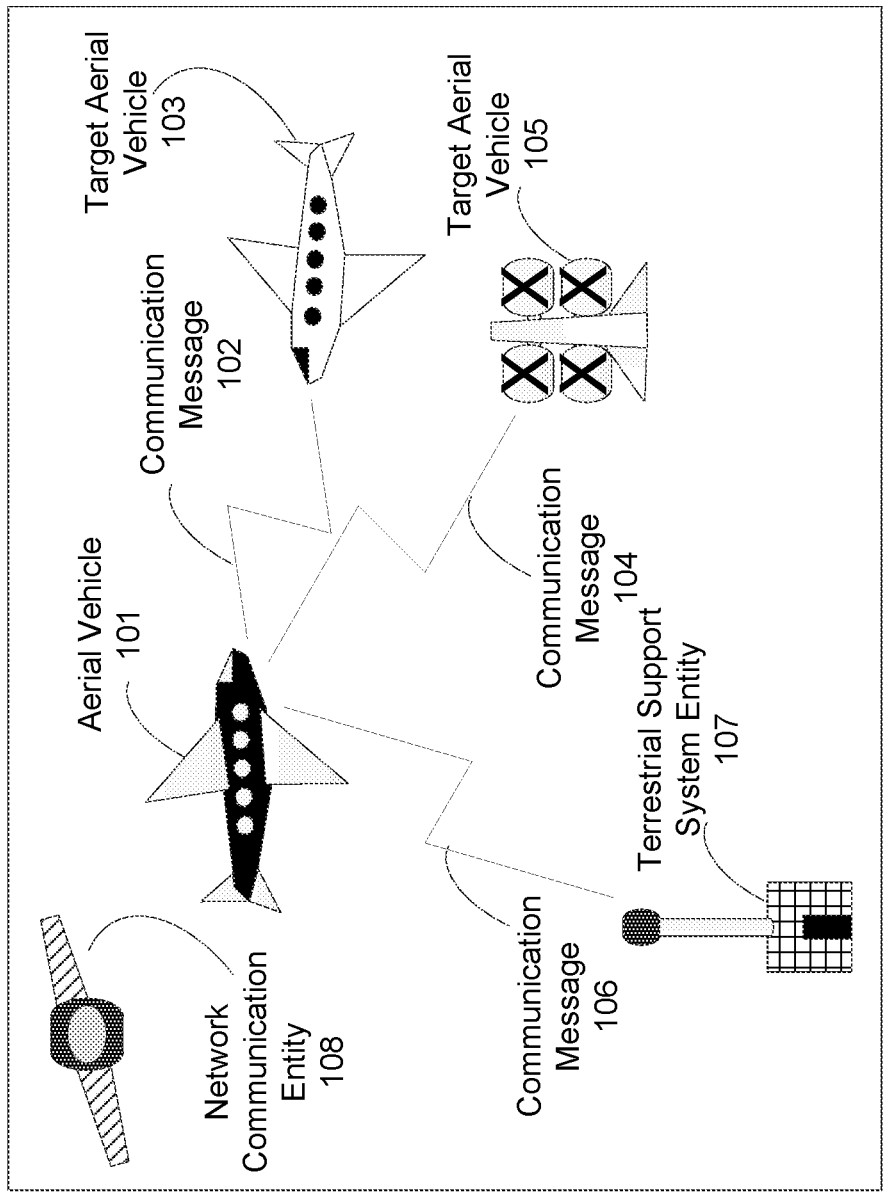
FIG. 1 is a simplified illustration of an aerial vehicle containing an autonomous aerial communication system communicating with a legacy aerial vehicle, an unmanned aerial system, and a terrestrial support system entity according to an example embodiment.

Exemplary methods and systems are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are contemplated herein.

I. Overview

The present embodiments relate to methods, systems, and devices that can help an aerial vehicle to effectively communicate autonomously with a variety of coexisting entities based on the system's ability to switch between communication languages understood by different types of recipients. For instance, it may be advantageous for a communication message to be sent to a manned air-traffic controller station, as well as an unmanned aerial system, and each recipient to understand the message it receives.

In particular, example embodiments can help a UAS, or other aerial vehicles, effectively and efficiently engage in autonomous communications with humans, and with autonomous or semi-autonomous systems. Examples include legacy aerial vehicles and related support system entities, UASs (e.g., quad-copters, tail-sitter UASs), or hybrid aerial vehicles (e.g., amphibious crafts that are capable of operation on land as well as on water, a floatplane that is capable of landing on water as well as on land).

For example, an autonomous aerial communications system may be implemented on a UAS to facilitate communication with a manned aerial vehicle in a natural language that is understood by the vehicle's pilot, a machine language that is understood by the aerial vehicle's operational system, or both. This ability to autonomously communicate with by both human-operated and computer-automated entities, in languages most readily understood by each type of entity, is advantageous for the operation of the aerial vehicle and the other entities alike.

In example embodiments, the system may determine that certain information should be communicated based on detecting data associated with an event, wherein an event is any occurrence that pertains to the operation of the entity on which the system is implemented, the operation of other entities, or both (e.g., flight management parameters of an aerial vehicle on which the system is implemented, flight management parameters of aerial vehicles in the system's vicinity and/or abroad, weather conditions, intervening circumstances). For example, the system implemented on an aerial vehicle may receive data associated with an event indicating an intervening circumstance (e.g., oncoming inclement weather, diminishing fuel sources, the unavailability of a previously designated flight path or landing zone, the introduction of additional aerial vehicles near a flight path, the transition between different classes of airspaces, etc.) and determine that this information should be communicated reflecting such circumstances.

In a further aspect, the system may determine that, based on these intervening circumstances, the information that needs to be communicated is the proposal of a new flight path under which the aerial vehicle should proceed. In other example embodiments, the system may also determine that this information includes not only the aerial vehicle's own proposed flight path, but also proposed flight paths for other aerial entities in its proximity, abroad, or both.

In example embodiments, the aerial vehicle may adjust the form or forms in which information is conveyed based upon the particular recipient or recipients to which the information is being conveyed. To be properly understood by the target recipient or recipients, however, these communications may be delivered in one or more specific languages. In some embodiments, the system may detect certain operational parameters of one or more target aerial vehicles and identify whether each target aerial vehicle is human operated, computer operated, or perhaps both, based on the identified operational parameters. To increase the likelihood that the information will be understood by the target aerial vehicle or vehicles, the system then selects a language or languages associated the target aerial vehicle or vehicles. These languages, for example, may include one or more natural languages (e.g., English, Spanish, German, etc.), one or more machine languages (e.g., XML, etc.), or both.

Once the aerial vehicle's autonomous aerial communication system has determined the information that should be communicated, the target recipient or recipients, identified whether each is computer operated, human operated, or both, and selected the language by which that information should be conveyed, the system may then generate and transmit a message expressing that information in the language or languages most likely to be understood by the target recipient or recipients.

In example embodiments, the system may determine that the aerial vehicle needs to change course, or change flight plans or routing in some way, based on an intervening circumstance (e.g., inclement weather), detect at least one nearby target aerial vehicle, identify that the target aerial vehicle is being autonomously piloted by a certain type of autonomous flight system, select a machine language associated with the target aerial vehicle's automated flight system, generate a message in the associated machine language, and transmit the message to the nearby target aerial vehicle. In other example embodiments, the system may determine that the aerial vehicle needs to change course, detect at least one nearby target aerial vehicle, identify that the target aerial vehicle is being piloted by a human, select a natural language associated with the target aerial vehicle's pilot, generate a message in the associated natural language, and transmit the message to the nearby target aerial vehicle. In a further aspect, the message transmitted to the target aerial vehicle or vehicles may not require an affirmative response (e.g., the autonomous aerial communication system may transmit a message to other aerial vehicles indicating it has nothing to report).

In other example embodiments, the system may detect data associated with an event (e.g., the need to transition between different classes of airspaces) and determine that information needs to be communicated (e.g., a request to transition between such airspaces), to at least one target recipient, which may include a terrestrial support system entity (including a wholly or partially computer-automated air traffic control system, a manned air-traffic controller station, or both), a legacy aerial vehicle, or an unmanned aerial system.

II. Illustrative Autonomous Aerial Communication Systems

Disclosed herein are methods, systems, and devices related to providing autonomous communications between aerial vehicles. These communications are generated in response to detecting data from one or more sources, identifying whether the recipient is human operator, computer operated, or both, and generating a message to be sent to the recipient in a language that is based on the determined identity of the recipient—and not the content of the message itself.

FIG. 1 is a simplified diagram of an aerial vehicle 101 containing an autonomous aerial communication system communicating with a first target aerial vehicle 103, a second target aerial vehicle 105, and a terrestrial support system entity 107.

In the illustrated embodiment, the autonomous aerial communication system associated with aerial vehicle 101 may send a communication message 102 to a first target vehicle 103. In a further aspect, the first target vehicle may be a legacy aerial vehicle, which may be computer operated, human operated, or both. In this example, it may be advantageous for the autonomous aerial communication system to send the communication message in a language that the legacy aerial vehicle will understand. For example, if the legacy aerial vehicle is human operated only, then the communication message 102 should be sent in a language that the human recipient will understand, which may include voice messages in a certain language transmitted by analog means (e.g., VHF ("very high frequency") type or HF ("high frequency")) and/or digital means (e.g., Voice over IP). Other examples are also possible. Alternatively, if the legacy aerial vehicle is computer operated only, then the communication message 102 should be sent in a language that the computer recipient will understand, which may include messages transmitted by digital means (e.g., XML over one or more wireless networks). Other examples are also possible.

In the illustrated embodiment, the autonomous aerial communication system associated with the aerial vehicle 101 may send a communication message 104 to a second target vehicle 105. In a further aspect, the second target vehicle may be an unmanned aerial system, which may be computer operated, human operated, or both. In this example, it may be advantageous for the autonomous aerial communication system to send the communication message in a language that the UAS and/or its operator will understand. For example, if the UAS is human operated only (e.g., the UAS acts as a relay for communications from other aerial vehicle to the UAS's operator) then the communication message 104 should be sent in a language that the human recipient will understand. In this example, it may be advantageous to send the communication message in a language that the human operator will understand without translation, which may include voice messages in a certain language transmitted by analog means (e.g., VHF ("very high frequency") type or HF ("high frequency")) and/or digital means (e.g., Voice over IP), or in a language that the UAS commonly communicates in, so that any translation the UAS performs before sending the communication message to its operator will be as efficient and accurate as possible. Moreover, if the UAS is computer operated only, then the communication message 104 should be sent in a language that the computer recipient will understand, which, as addressed above, may include the language that the UAS commonly communicates in. Other examples are also possible.

In the illustrated embodiment, the autonomous aerial communication system associated with the aerial vehicle 101 may send a communication message 106 to a terrestrial support system entity 107. In a further aspect, the terrestrial support system entity may be computer operated, human operated, or both. Accordingly, in this example, it may be advantageous for the autonomous aerial communication system to send the communication message in a language that the terrestrial support network will understand. For example, if the legacy aerial vehicle is human operated only, then the communication message 106 should be sent in a language that the human recipient will understand, which may include voice messages transmitted by analog means (e.g., VHF ("very high frequency") type or HF ("high frequency")) and/or digital means (e.g., Voice over IP). Other examples are also possible. Alternatively, if the terrestrial support system entity is computer operated only, then the communication message 106 should be sent in a language that the computer recipient will understand, which may include messages transmitted by digital means (e.g., XML over one or more wireless networks). Other examples are also possible.

In the illustrated embodiment, in a further aspect, the autonomous aerial communication system implemented on aerial vehicle 101 may communicate with a first target aerial vehicle 103, a second target aerial vehicle 105, and a terrestrial support system entity 107, based on the operation of all four entities within a network. For example, the autonomous aerial communication system implemented on aerial vehicle 101 may communicate with a first target aerial vehicle 103 (e.g., a human-operated legacy aerial vehicle), a second target aerial vehicle 105 (e.g., a computer-operated UAS) and a terrestrial support system entity 107 (e.g., which may be both human and computer operated) based on the operation of all four entities within a wireless communications network which may be defined by, or merely served by, one or more network communication entities 108 (e.g., a satellite communication network).

In a further aspect, although the illustrative autonomous aerial communications system discussed above is discussed in terms of effectuating communication with at least one target aerial vehicle, nothing described in this illustrative embodiment should be construed to limit the application of this system to effectuating communication with aerial vehicles only. Instead, the illustrative system described above could also be used to effectuate communication with non-aerial vehicles (e.g., a related terrestrial support system entity, which may include a wholly or partially computer-automated air traffic control system, a manned air-traffic controller station, or both).

III. Illustrative Autonomous Aerial Communications System Components

Figure 2:
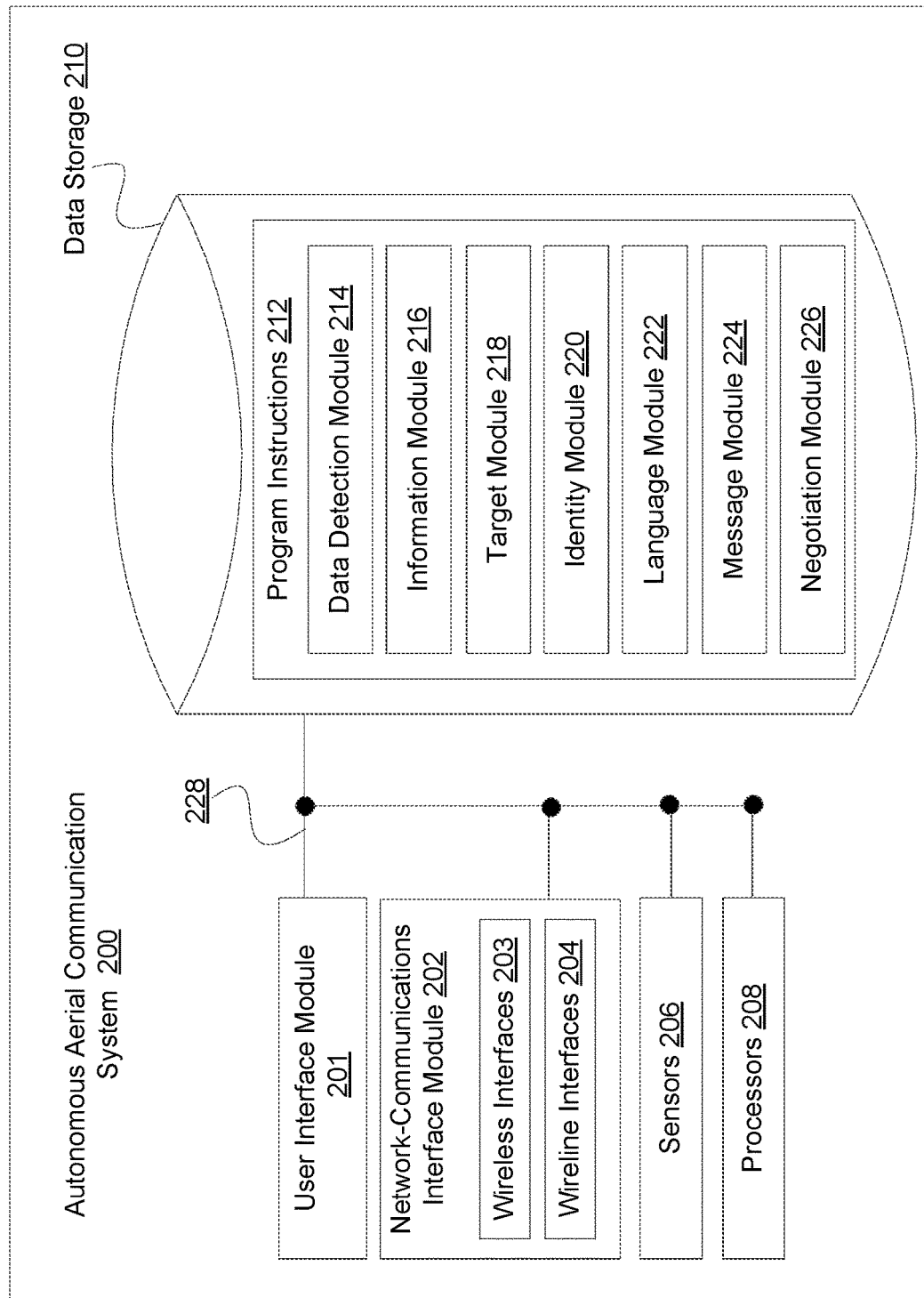
FIG. 2 is a simplified block diagram illustrating components of an autonomous aerial communications system, according to an example embodiment.

FIG. 2 is a simplified block diagram illustrating components of an autonomous aerial communications system 200, according to an example embodiment. Autonomous aerial communications may be implemented in one of the aerial vehicles 101, 103, and/or 105, and/or in a terrestrial system, such as a terrestrial support system entity 107 described in reference to FIG. 1. Autonomous aerial communications system 200, however, may also take other forms.

Autonomous aerial communication system 200 may include a user interface module 201, a network-communication interface module 202, and one or more sensors 206, one or more processors 208, and data storage 210, all of which may be linked together via a system bus, network, or other connection mechanism 228.

Specifically, autonomous aerial communications system 200 may include various types of communication interfaces, and may include a computing system configured to provide the functionality described herein. In the illustrated embodiment, the communication interfaces of autonomous aerial communications system 200 may include communication interfaces 201 and 202.

In the illustrated embodiment, autonomous aerial communications system 200 may also include various types of sensors 206, and may include a computing system configured to provide the functionality described herein.

In the illustrated embodiment, autonomous aerial communications system 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of the autonomous aerial communications system 200 described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the autonomous aerial communications system 200. As such, the data storage 210 may include program instructions 212 to perform or facilitate some or all of the he autonomous aerial communications system functionality described herein. For instance, in the illustrated embodiment, program instructions 212 include a data detection module 214, an information module 216, a target module 218, an identity module 220, a language module 222, a message module 224, and a negotiation module 226.

A. Communication Interfaces

In an illustrative embodiment, user interface module 201 can be operable to send data to and/or receive data from external user input/output devices. For example, user interface module 201 can be configured to send and/or receive data to and/or from user input devices such as a keyboard, a keypad, a touch screen, a computer mouse, a track ball, a joystick, a camera, a voice recognition module, and/or other similar devices. User interface module 201 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 201 can also be configured to generate audible output(s), such as a speaker, speaker jack, audio output port, audio output device, earphones, and/or other similar devices.

Network-communications interface module 202 can include one or more wireless interfaces 203 and/or one or more wireline interfaces 204 that are configurable to communicate with one or more networks. Wireless interfaces 203 can include one or more wireless transmitters, receivers, and/or transceivers. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Wireline interfaces 204 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network-communications interface module 202 can perform at least some of the functionality of a communication interface for the autonomous aerial communication systems in the aerial vehicle discussed above in the context of at least FIG. 1. For example, network-communications interface module 202 can include a tunable aviation radio configured for use in voice communications and/or a radar transponder for automatically reporting data, such as one or more events related to an aerial vehicle's operation.

In other embodiments, network communications interface module 202 can be configured to provide reliable, secured, and/or authenticated communications. For each communication, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

In some embodiments, the autonomous aerial communications system 200 may include a network-communications interface module 202 that allows for both short-range communication and long-range communication. For example, the autonomous aerial communications system 200 may be configured for short-range communications using Bluetooth and for long-range communications under a CDMA protocol. In such an embodiment, the autonomous aerial communications system 200 may be configured to function as a "hot spot;" or in other words, as a gateway or proxy between a remote support device and one or more data networks, such as a cellular network and/or the Internet. Configured as such, the autonomous aerial communications system 200 may facilitate data communications that the remote support device would otherwise be unable to perform by itself.

For example, the autonomous aerial communications system 200 may provide a WiFi connection to a remote device, and serve as a proxy or gateway to a cellular service provider's data network, which the autonomous aerial communications system might connect to under an LTE or a 3G protocol, for instance. The autonomous aerial communications system 200 could also serve as a proxy or gateway to a high-altitude balloon network, a satellite network, or a combination of these networks, among others, which a remote device might not be able to otherwise access.

B. Sensors

In an illustrative embodiment, sensors 206 may include an IMU, which may include both an accelerometer and a gyroscope. Furthermore, the accelerometer and the gyroscope may be used together to determine an orientation of the autonomous aerial communications system 200 and/or an orientation of the aerial vehicle on which it is implemented. In particular, the accelerometer can measure the orientation of the aerial vehicle with respect to earth, while the gyroscope measures the rate of rotation around an axis. IMUs are commercially available in low-cost, low-power packages. For instance, an IMU may take the form of or include a miniaturized MicroElectroMechanical System (MEMS) or a NanoElectroMechanical System (NEMS). Other types of IMUs may also be utilized.

In addition to accelerometers and gyroscopes, other sensors 206 may be utilized to help to better determine position and/or help to increase autonomy of the aerial communication system 200. Two examples of such sensors are magnetometers and pressure sensors. In some embodiments, the autonomous aerial communications system may include a low-power, digital 3-axis magnetometer, which can be used to realize an orientation independent electronic compass for accurate heading information. However, other types of magnetometers may be utilized as well. Other examples are also possible. Further, note that an autonomous aerial communications system could include some or all of the above-described inertia sensors as separate components from an IMU.

Autonomous aerial communications system 200 may also include a pressure sensor or barometer, which can be used to determine the altitude of the autonomous aerial communications system. Alternatively, other sensors, such as sonic altimeters or radar altimeters, can be used to provide an indication of altitude, which may help to improve the accuracy of and/or prevent drift of an IMU.

In a further aspect, autonomous aerial communications system 200 may include one or more sensors that allow the autonomous aerial communications system to sense objects in the environment. For instance, autonomous aerial communications system 200 may include one or more ultrasonic sensors. Ultrasonic sensors can determine the distance to an object by generating sound waves and determining the time interval between transmission of the wave and receiving the corresponding echo off an object. Further, an ultrasonic sensor can also be used for vehicles that need to hover at a certain height or need to be capable of detecting obstacles. Other sensors can be used to determine, sense the presence of, and/or determine the distance to nearby objects, such as a light detection and ranging (LIDAR) sensor, laser detection and ranging (LADAR) sensor, and/or an infrared or forward-looking infrared (FLIR) sensor, among other possibilities.

In some embodiments, autonomous aerial communications system 200 may also include one or more imaging sensors. For example, one or more still and/or video cameras may be utilized by the autonomous aerial communications system to capture image data from the environment in which it operates. As a specific example, charge-coupled device (CCD) cameras or complementary metal-oxide-semiconductor (CMOS) cameras can be used with the autonomous aerial communications system 200. Such imaging sensors have numerous possible applications, such as obstacle avoidance, localization techniques, ground tracking for more accurate navigation (e.g., by applying optical flow techniques to images), video feedback, and/or image recognition and processing, among other possibilities.

Autonomous aerial communications system 200 may also include a GPS receiver. The GPS receiver may be configured to provide data that is typical of well-known GPS systems, such as the GPS coordinates of the autonomous aerial communications system 200. Such GPS data may be utilized by the autonomous aerial communications system 200 for various functions. As such, the autonomous aerial communications system may use its GPS receiver to help navigate to the destination, as indicated, at least in part, by the GPS coordinates provided by a destination entity. Other examples, of course, are also possible.

In further examples, sensors 206 can be configured to measure other conditions in an environment of the autonomous aerial communications system 200 and provide data about that environment. For example, sensor 206 can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of the autonomous aerial communications system 200, such as, but not limited to, those addressed above (e.g., a gyroscope, an accelerometer, a Global Positioning System (GPS) device, a sonar sensor, a radar device, etc.), a laser-displacement sensor, a Doppler sensor, and a compass; (iii) an environmental sensor to obtain data indicative of an environment of the autonomous aerial communications system 200, such as, but not limited to, those addressed above (e.g., an altimeter, an infrared sensor, a camera, etc.), a biosensor, a capacitive sensor, a touch sensor, a temperature sensor, a wireless sensor, a radio sensor, a movement sensor, a microphone, a sound sensor, an ultrasound sensor, an optical sensor, a light sensor, and/or a smoke sensor; (iv) structural and resource sensors measuring the integrity and/or integrity of the autonomous aerial communications system 200, the vehicle on which the autonomous aerial communications system is implemented (and/or other vehicles), or both, such as, but not limited to, fuel sensors, battery sensors, sensors associated with structural portions of the vehicle (e.g., exit door sensors, landing gear deployment sensors, etc.); and (v) a force sensor to measure one or more forces (e.g., inertial forces and/or G-forces) acting about the autonomous aerial communications system 200, such as, but not limited to one or more sensors that measure: forces in one or more dimensions, torque, ground force, friction, and/or a zero moment point (ZMP) sensor that identifies ZMPs and/or locations of the ZMPs. Many other examples of sensors 206, of course, are possible as well.

C. Data Detection Determination

The data detection module 214 may provide functionality that allows the autonomous aerial communication system 200 to, e.g., detect data pertaining to the operation of the aerial vehicle on which the system is implanted, as well as other entities in its vicinity or abroad. To do so, the data detection module 214 may manage the data detected from the interfaces and sensors of the autonomous aerial communication system 200.

In some embodiments, the data detection module 214 may manage the data it receives from the interfaces and sensors of the autonomous aerial communication system 200 by prioritizing the data received based on one or more parameters of the data received. In one embodiment, these parameters may include the urgency and/or priority of the event indicated by the data detected. For example, if the data detection module 214 determines that certain data is indicative of an event that should be prioritized (e.g., a temperature sensor and/or a smoke sensor conveying data indicating that the aerial vehicle is on fire) over other events (e.g., a GPS receiver conveying data indicating that the aerial vehicle is on the correct flight path), then the data detection module 214 may place the prioritized data ahead of other data to be processed.

In another example, such parameters may include the source from which the data received. For example, it may be advantageous to prioritize the processing of data detected from a certain communication interface over other communication interfaces and/or sensors. Accordingly, in this example, if the data detection module 214 determines that certain data is being detected from the certain communication interface (e.g., a pilot is typing in an inquiry into the user interface module), then the data detection module 214 may determine that the data being detected from said interface should be prioritized ahead of other data being detected from other interfaces and/or sensors (e.g., a temperature sensor indicating the temperature inside the aerial vehicle) for processing.

In yet another example, such parameters may include a preset range for the one or more types of data detected. For example, it may be advantageous to only process detected data based whether it is within or outside a certain preset range defining what events and data should be detected and which should not. Accordingly, in this example, if the data detection module 214 determines that the data being detected from a certain interface or sensor is within or outside a certain preset (e.g., a force sensor indicating data associated with a G-force outside of the normal operating range of the vehicle), then the data detection module 214 may determine that the data associated with a certain interface or sensor should be detected.

In other embodiments, the data detection module 214 may manage all the data detected from the interfaces and sensors of the autonomous aerial communication system 200 by aggregating the detected data based only order of detection alone. For example, it may be advantageous for the data detection module 214 to detect all data from the interfaces and sensors of the autonomous aerial communication system 200, arrange the data in order it was received, and allow any further prioritization or refinement of the data to be performed by another module and/or a post-processing entity. Other data management techniques may also be utilized.

D. Information Detection

The information module 216 may provide functionality that allows the autonomous aerial communication system 200 to, e.g., determine information related to the event that should be communicated to operators of the aerial vehicle on which the system is implemented and/or other entities in its vicinity or abroad. To do so, the data detection module 216 may determine information associated with the event and then determine whether the information associated with the event should be communicated.

In one embodiment, the information module 216 may determine information that should be communicated based on the data it receives from the data detection module of the autonomous aerial communication system 200 by determining whether the information related to the event is or is not within a preset range for the one or more types of data detected. For example, it may be advantageous to only relay information related to an event based on whether the information reflects detected data that is or is not within certain preset ranges defining what information should be communicated and which should not. Accordingly, in this example, if the information module 216 determines that the data associated with an event being detected from a certain interface or sensor is outside or within a certain preset range (e.g., a force sensor indicating data associated with a G-force outside of the normal operating range of the vehicle and/or a fuel sensor indicating that vehicle is out of fuel), then the information module 216 may determine that information should be communicated (e.g., "SOS," "Mayday," "More Fuel Needed," "My Current Coordinates are 41.87765, −87.637109," etc.).

In other embodiments, the information module 216 may determine information that should be communicated based on whether the data associated with the event came from one more sources. For example, it may be advantageous to always determine that information should be communicated if the data associated with event to which the information is related was detected from the certain communication interface (e.g., a pilot entering a system inquiry into the user interface module, which may always require a prompt response).

In other embodiments, the information module 216 may determine information that should be communicated based on the content of the information. For example, it may be advantageous to determine that information should be always communicated if the information pertains to proposed flights paths for the aerial vehicle on which the autonomous aerial communication system 200 is implemented, one or more target aerial vehicles, or both. Other determined information management techniques may also be utilized.

E. Target Detection

The target module 218 may provide functionality that allows the autonomous aerial communication system 200 to, e.g., determine a target aerial vehicle to which the information should be communicated. To do so, the target module 218 may determine the target aerial vehicle to which the information should be communicated based on specific need of the autonomous aerial communication system 200 and/or the vehicle on which the system is implemented, one or more characteristics of one or more related entities, or some standard operating protocol of the vehicle on which the autonomous aerial communication system is implemented and/or the environment in which the vehicle and/or the system operates.

In one embodiment, the target module 218 may determine the target aerial vehicle to which the information should be communicated based on the specific need or needs of the autonomous aerial communication system 200, the vehicle on which the system is implemented, or both. For example, the target module 218 may determine that the vehicle on which the autonomous aerial communication system 200 is implemented is running low on fuel and that the information reflecting that lack of fuel should be communicated to a nearby fuel-bearing source. In a further aspect, the target module 218 may determine that a fuel-bearing source (e.g., an aerial refueling aircraft, a terrestrial fuel supplier, etc.) is nearby. Accordingly, in this example, the target module 218 may determine the target aerial vehicle to which the information should be communicated is the nearby fuel-bearing source.

In one embodiment, the target module 218 may determine the target aerial vehicle to which the information should be communicated based on one or more characteristics of one or more related entities. For example, the target module 218 may determine that a related entity (e.g., a nearby aerial vehicle, the airspace in which the vehicle is operating, etc.) has one or more characteristics that affect the vehicle on which the autonomous aerial communication system 200 is implemented (e.g., an unsafe trajectory or velocity of the nearby aerial vehicle, inclement weather in the airspace in which the vehicle is operating, etc.) and that such information should be communicated to the target aerial vehicle (e.g., the nearby aerial vehicle operating unsafely, another nearby aerial vehicle, a terrestrial support system entity operating within a network, etc.).

In yet another embodiment, the target module 218 may determine the target aerial vehicle to which the information should be communicated based on one or more standard operating protocols of the vehicle on which the autonomous aerial communication system is implemented and/or the environment in which the vehicle and/or the system operates. For example, the target module 218 may determine that, based on one or more standard operating protocols of the airspace in which the autonomous aerial communication system operates (e.g., that any vehicle operating within a mile radius of the system should be apprised of the system's GPS coordinates), information should be communicated to a certain target aerial vehicle (e.g., an aerial vehicle operating within a mile radius of the system). Of course, other target aerial vehicle identification methods may also be utilized.

F. Identity Detection

The identity module 220 may provide functionality that allows the autonomous aerial communication system 200 to, e.g., identify one or more operational parameters of the target aerial vehicle, wherein the at least one operational parameter indicates whether the target aerial vehicle is human operated, computer operated, or both. To do so, the identity module 220 may identify the operational parameters indicating whether the target aerial vehicle is human operated, computer operated, or both, based on the detection of and interaction with other autonomous communication systems, the use of one or more handshake protocols between the autonomous aerial communication system and the target aerial vehicle, or default operational parameters ascribed to a class of entities of which the target aerial vehicle may be a part.

In one embodiment, the identity module 220 may identify the operational parameters of the target aerial vehicle to which the information should be communicated based on the detection of and interaction with an autonomous communication system associated with that target aerial vehicle. For example, after a target aerial vehicle is determined, the identity module 220, may detecting that the target aerial vehicle has an associated autonomous communication system by identifying one or more operational parameters associated with autonomous communication systems. In a further aspect, the identification one or more operational parameters associated with the autonomous communication system may be indicative of whether the target vehicle on which the system is implemented is human operated, computer operated, or both (e.g., the target aerial vehicle's autonomous communication system may have an operational parameter that automatically reports that the vehicle is being operated by a human, by a computer, or both, to any other autonomous communication system in a predefined vicinity).

In another embodiment, the identity module 220 may identify the operational parameters of the target vehicle through the use of one or more handshake protocols between the autonomous aerial communication system and the target aerial vehicle. For example, the identity module 220 may identify the operational parameters of the target vehicle through the use of a protocol that prompts a nearby aerial vehicle with an invitation for response in one or more formats (e.g., pinging other autonomous communication systems, broadcasting an analog radio that prompts—in a natural language—the target vehicle to "Please identify yourself," inviting a computer system to respond in a standardized computer language, etc.), and then analyzing the source of the response received from the target aerial vehicle (e.g., receiving an analog voice response "This is Ted," only, may indicate that the target aerial vehicle is human operated).

In yet another embodiment, the identity module 220 may identify the operational parameters of the target vehicle by referring to a repository of operational parameters which may be ascribed to a class of entities of which the target aerial vehicle may be a part. For example, the identity module 220 may identify the operational parameters of the target aerial vehicle by determining certain characteristics of the target aerial vehicle (e.g., that the aerial vehicle is a legacy aerial vehicle, which, statistically, almost always contains an autonomous communications system) and referring to a repository containing the standard operating parameters of a class of entities of which the target aerial vehicle may be a part (e.g., all aerial vehicles of this type should be assumed to be operated by both a human and a computer, and should be communicated with by both human and computer means). Other target identity detection methods may also be utilized.

G. Language Selection

The language module 222 may provide functionality that allows the autonomous aerial communication system 200 to, e.g., select one or more languages associated with the target aerial vehicle from a plurality of languages. To do so, the language module 222 may utilize the one or more operational parameters identified by the identity module 220, which may be indicative of whether the target aerial vehicle is human operated, computer operated, or both, to select the language which is most likely to be understood by the operator[s] of the target aerial vehicle. Moreover, the language module 222 selects the one or more languages from a plurality of languages, wherein any natural language associated with human-operated target aerial vehicles is selected from a set of multiple natural-language communication capabilities and any machine language associated with computer-operated target aerial vehicles is selected from a set of multiple computer-language communication capabilities.

In one embodiment, the language module 222 may use the operational parameters identified by the identity module 220 of an autonomous communication system associated with that target aerial vehicle. For example, the language module 222 may select one or more languages associated with the target aerial vehicle based on one or more operational parameters associated with autonomous communication system implemented on the target aerial vehicle. Moreover, the language module 222 may select one or more languages associated with the target aerial vehicle based on one or more operational parameters of the vehicle indicating whether the vehicle is human operated, computer operated, or both (e.g., the target aerial vehicle's autonomous communication system may have an operational parameter automatically reporting that the vehicle is being operated by a human, by a computer, or both, to any other autonomous communication system in a predefined vicinity). In a further aspect, the language module 222 may select one or more languages associated with the target aerial vehicle based on one or more operational parameters of the vehicle indicating what language in which the human operator, computer operator, or both would prefer to communicate (e.g., the target aerial vehicle's autonomous communication system may have an operational parameter automatically reporting that the vehicle is being operated by a human who prefers to be communicated with in Spanish and by a computer that prefers to be communicated with in XML).

In another embodiment, the language module 222 may use the operational parameters identified by the identity module 220 through the use of one or more handshake protocols between the autonomous aerial communication system and the target aerial vehicle. For example, the language module 222 may select one or more languages associated with the target aerial vehicle based on the operational parameters of the target vehicle ascertained through the use of a protocol that prompts a nearby aerial vehicle with an invitation for response and analyzing the source of the response received from the target aerial vehicle (e.g., receiving an acknowledgement of receipt of the invitation in only XML may indicate that the target aerial vehicle is computer operated and prefers to communicate in XML).

In yet another embodiment, the language module 222 may use the operational parameters identified by the identity module 220 by referring to a repository of operational parameters for a class of entities of which the target aerial vehicle may be a part. For example, the language module 222 may select one or more languages associated with the target aerial vehicle based on the operational parameters of the target vehicle ascertained by the identity module 220 by determining certain characteristics of the target aerial vehicle and referring to a repository containing the standard operating parameters of a class of entities of which the target aerial vehicle may be a part (e.g., because all aerial vehicles of a certain type should be assumed to be operated by both a human a human who prefers to be communicated with in Spanish and a computer that prefers to be communicated with in XML, all communicative languages should be chosen accordingly). Other target identity detection methods may also be utilized.

H. Message Generation

The message module 224 may provide functionality that allows the autonomous aerial communication system 200 to, e.g., generate a message in the one or more selected languages most likely to be understood by the target aerial vehicle. To do so, the message module 224 may utilize the one or more selected languages most likely to be understood by the human operator, computer operator, or both, of the target aerial vehicle. Moreover, the message module 224, utilizing those one or more languages, may generate a message which simply conveys the information to be communicated, a message that requires one or more affirmative responses, and/or a message that serves as an invitation to a negotiation session between the autonomous aerial communication system and the target aerial vehicle. Once generated, the message may be transmitted to the target aerial vehicle utilizing the same communication interfaces described above.

In one embodiment, the message module 224 may use the language or languages selected by the language module 222 to generate a message conveying the information that should be communicated, but may not require or even solicit a response. For example, the message module 224 may generate a message reflecting a characteristic of the aerial vehicle on which the autonomous aerial communication system 200 is implemented that is transmitted for the sole benefit of a target aerial vehicle (e.g., the autonomous aerial communication system may report the current weather of the airspace in which the aerial vehicle on which the system is implemented to entities abroad for their future reference only).

In another embodiment, the message module 224 may use the language or languages selected by the language module 222 to generate a message conveying the information that should be communicated and solicit a response and/or even require a response to discontinue transmitting the generated message. For example, the message module 224 may generate a message reflecting a characteristic of the aerial vehicle on which the autonomous aerial communication system 200 is implemented that is transmitted for the mutual benefit of the vehicle on which the system is implemented and a target aerial vehicle (e.g., the autonomous aerial communication system may report the current trajectory of the of the aerial vehicle on which the system is implemented to entities nearby and request and/or require acknowledgement to discontinue repeated generation and transmission of the message).

In yet another embodiment, the message module 224 may use the language or languages selected by the language module 222 to generate a message conveying the information that should be communicated to a first target aerial vehicle, transmit the message (which also solicits a response), and then, based on information contained in the response, transmit the message to a second target aerial vehicle and/or request that the first target vehicle transmit the message to the second target vehicle.

Figure 3:
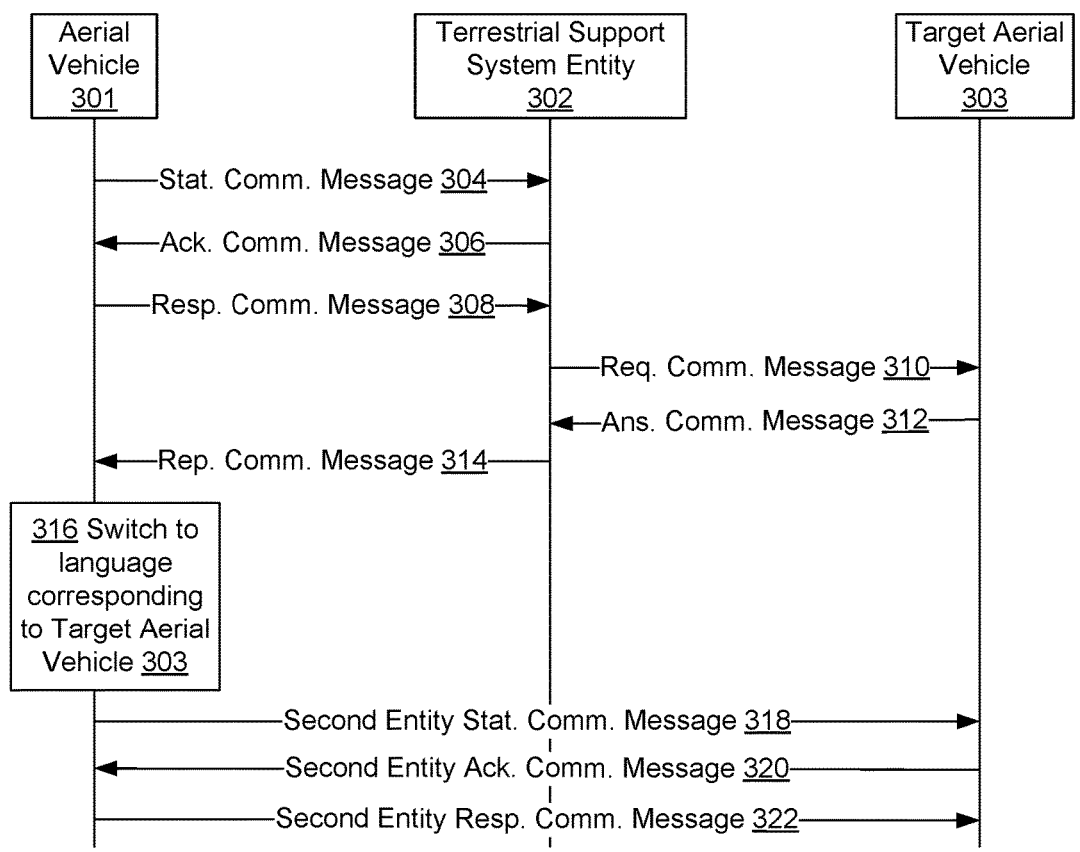
FIG. 3 is a flow diagram illustrating communication flows for an autonomous aerial communications system and a target aerial vehicle, according to an example embodiment.

For example, as illustrated in FIG. 3, the message module may generate a status communication message 304 reflecting the availability of information concerning a characteristic of the aerial vehicle 301 on which the autonomous aerial communication system is implemented (e.g., "Flight path information is currently available") that is transmitted to a terrestrial support system entity 302 and solicits a response before taking any further action (e.g., "Please acknowledge this message for any further information"). Then, after receiving the requested acknowledgement communication message 306, the message module may generate a response communication message 308 reflecting the information of a characteristic of the aerial vehicle 301 on which the autonomous aerial communication system is implemented (e.g., "The plane is currently traveling due north towards Chicago, Ill. at approximately 587 miles per hour") that is transmitted to the terrestrial support system entity 302 and also requests one or more operational parameters of a target aerial vehicle 303 that may not be easily ascertained. The terrestrial support system entity 302 may then send a request communication message 310 to the target aerial vehicle 303 requesting information concerning the operational parameter of the target aerial vehicle 303, which may be answered in an answer communication message 312 from the target aerial vehicle to the terrestrial support system entity. Furthermore, the terrestrial support system entity 302 may then send a report communication message 314 to the aerial vehicle 301 reporting the information concerning the operational parameter of the target aerial vehicle 303.

In a further aspect, based on the operational parameter information received, the message module may then generate a second entity status communication message 318 in the language most likely to be understood by the target aerial vehicle 303, as illustrated in FIG. 3—316, reflecting the availability of a characteristic of the aerial vehicle 301 on which the autonomous aerial communication system is implemented (e.g., "Flight path information is currently available") that is transmitted to the target aerial vehicle 303 and solicits a response before taking any further action (e.g., "Please acknowledge this message for any further information"). Then, after receiving the requested second entity acknowledgement communication message 320, the message module may generate a second entity response communication message 322 reflecting the information of a characteristic of the aerial vehicle 301 on which the autonomous aerial communication system is implemented (e.g., "The plane is currently traveling due north towards Chicago, Ill. at approximately 588 miles per hour") that is transmitted to the target aerial vehicle 303. Other message generation methods may also be utilized.

I. Negotiation Session Facilitation and Resolution

The negotiation module 226 may provide functionality that allows the autonomous aerial communication system 200 to, e.g., to negotiate one or more propositions with one or more one or more target aerial vehicles, the terrestrial support system entity, or both, in one or more languages most likely to be understood by the recipients. To do so, the negotiation module 226 may utilize the message module 224 to generate a message that serves as an invitation to a negotiation session between the autonomous aerial communication system and one or more target aerial vehicles, the terrestrial support system entity, or both, in one or more languages most likely to be understood by the recipients. Once the invitation is accepted by the one or more target aerial vehicles, the terrestrial support system entity, or both, the negotiation module may analyze pertinent data and/or information relating to the aerial vehicle, the target aerial vehicles, and/or the terrestrial support system entity and generate one or more propositions that should be communicated to one or more target aerial vehicles, the terrestrial support system entity, or both, in one or more languages most likely to be understood by the recipients.

In an example embodiment, the negotiation module 226 may utilize the message module 224 to generate a message that serves as an invitation to a negotiation session between the autonomous aerial communication system and a target aerial vehicle, in one or more languages most likely to be understood by the target aerial vehicle. Once the invitation is accepted by the target aerial vehicle, the negotiation module may then analyze data and/or information relating to the aerial vehicle and the target aerial vehicle and generate one or more propositions (e.g., a proposed flight path for the aerial vehicle, a proposed flight path for the target aerial vehicle, both, proposed flight paths for other aerial entities in the aerial vehicle's proximity, etc.) that should be communicated to the target aerial vehicle, in one or more languages most likely to be understood by the target aerial vehicle. The negotiation module 226 may then utilize the message module 224 to generate additional messages and propositions relating to the negotiation session (e.g., refined flight paths based on communication messages received during the course of the negotiation session) which may serve to bring the negotiation to a resolution.

In a further aspect, once the negotiation module 226 determines that a resolution has been reached between the aerial vehicle and the target aerial vehicle (i.e., that the proposed flight paths have been accepted by both parties, that both parties could not agree on one or more proposed flight paths, etc.), the negotiation module may utilize the message module 224 to generate a message that reports the content and resolution of the negotiation session between the autonomous aerial communication system and the target aerial vehicle, to a terrestrial support system entity, one or more other target aerial vehicles, or both, in one or more languages most likely to be understood by the recipients. Additionally, it may be advantageous for the one or more recipients (e.g., the terrestrial support system entity) to relay the content and resolution of the negotiation session to a centralized database (e.g., through the entity's operation within a network) for use by other entities in its proximity, abroad, or both.

In other embodiments, it may be advantageous for the system to transmit a message proposing a negotiation session with one or more target aerial vehicles, in which the system may negotiate with the target aerial vehicle or vehicles the logistics of a proposed flight path for the aerial vehicle, the proposed flight paths of other aerial vehicles, or both. In a further aspect, the autonomous aerial communication system may also conduct the negotiation session with one or more target aerial vehicles (e.g., other autonomous communication systems), and then transmit the results of that negotiation session in a message to one or more other target aerial vehicles (e.g., in an informational message only or as an invitation to enter into another negotiation session based on the results of the preceding negotiation session).

In these embodiments, the negotiation module 226 may utilize the message module 224 to generate a message that serves as a request to an entity to facilitate one or more invitations to a negotiation session between the autonomous aerial communication system and a terrestrial support system entity, one or more other target aerial vehicles, or both.

Figure 4:
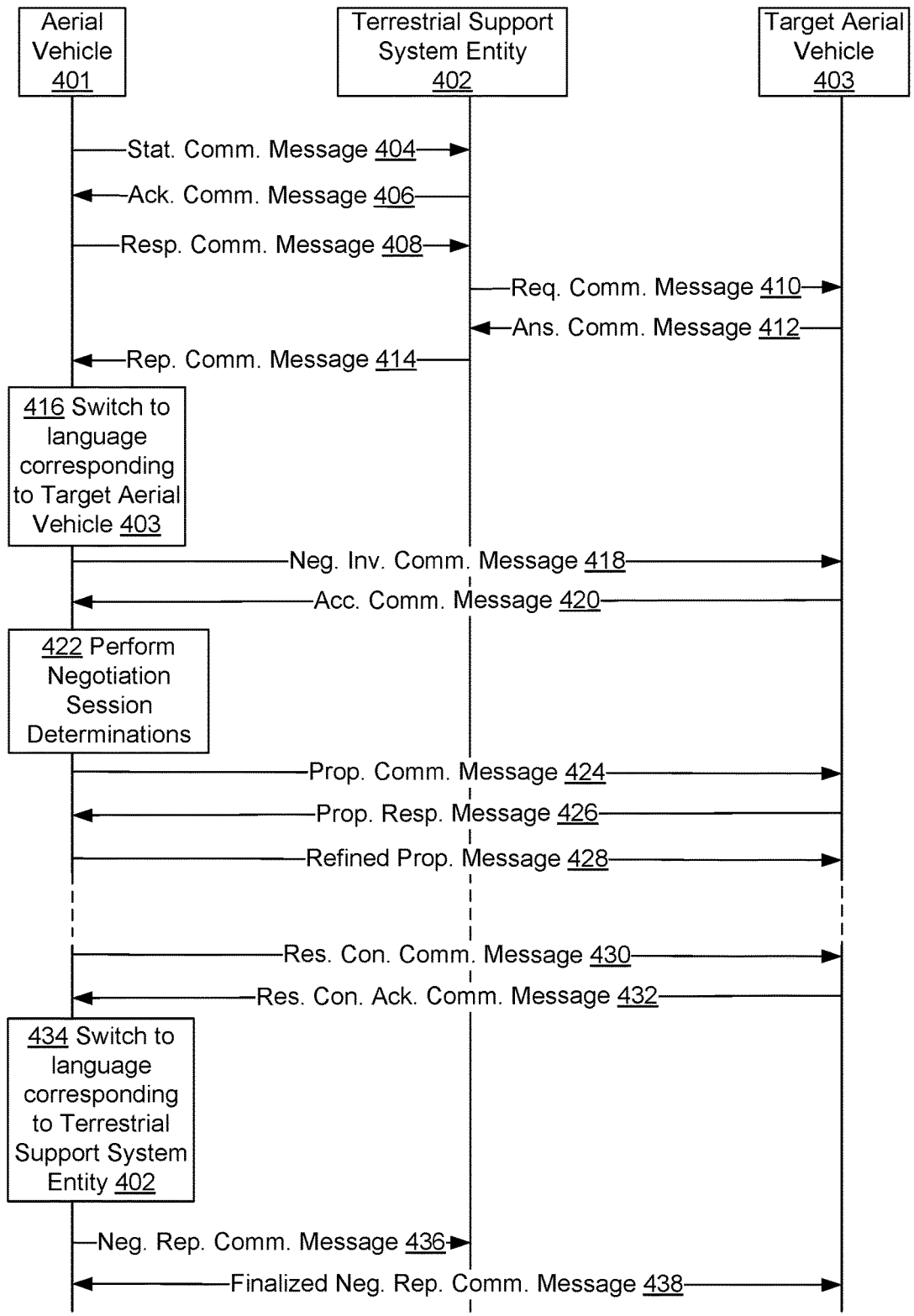
FIG. 4 is a flow diagram illustrating communication flows for an autonomous aerial communications system, a terrestrial support system entity, and a target aerial vehicle, according to an example embodiment.

For example, as illustrated in FIG. 4, the message module may generate a status communication message 404 reflecting the availability of a negotiation session with the aerial vehicle 401 on which the autonomous aerial communication system is implemented (e.g., "Negotiation capabilities are currently available") that is transmitted to a terrestrial support system entity 402 and solicits a response before taking any further action (e.g., "Please acknowledge this message for any further information"). Then, after receiving the requested acknowledgement communication message 406, the negotiation message module may utilize the message module to generate a response communication message 408 providing information concerning the negotiation session with the aerial vehicle 401 (e.g., "We are currently looking to negotiate proposed flight paths with another aerial vehicle within a 100 mile radius of this aerial vehicle") that is transmitted to the terrestrial support system entity 402 and also requests that the message be relayed to a potential party to the negotiation session. The terrestrial support system entity 402 may then send a request communication message 410 to a target aerial vehicle 403 requesting that the target aerial vehicle provide information concerning its interest in the negotiation session, which may be answered in an answer communication message 412 from the target aerial vehicle to the terrestrial support system entity. Furthermore, the terrestrial support system entity 402 may send a report communication message 414 to the aerial vehicle 401 reporting the information concerning the negotiation session with the target aerial vehicle 403.

In a further aspect, based on the information received, the negotiation module 226 may utilize the message module 224 to generate a negotiation invitation communication message 418 in the language most likely to be understood by the target aerial vehicle 403, as illustrated in FIG. 4—416, inviting the target aerial vehicle to a negotiation session with the aerial vehicle 401 (e.g., "Negotiation capabilities are currently available") that is transmitted to the target aerial vehicle 403 and solicits a response before taking any further action (e.g., "Please acknowledge this message for any further information"). Then, after receiving the requested acceptance communication message 420, the negotiation module may utilize the message module to generate one or more proposal communication messages 424 that are transmitted to the target aerial vehicle, process any proposal response communication messages 426 by the target aerial vehicle to these proposals, and respond with one or more refined proposal communication 428, as illustrated in FIG. 4—422, 424, 426, and 428, until a resolution is reached in the negotiation session.

After such a resolution is reached, the negotiation module may utilize the message module to generate a resolution confirmation communication message 430 requesting that the target aerial vehicle confirm the resolution of the negotiation session with the aerial vehicle 401, which also solicits a response before taking any further action.

Once the negotiation module 226 determines that it has received a resolution confirmation acknowledgement communication message 432 from the target aerial vehicle 403, the negotiation module may utilize the message module 224 to generate a negotiation report communication message 436 in the language most likely to be understood by the terrestrial support system entity 402, as illustrated in FIG. 4—434, reporting the content and resolution of the negotiation session between the autonomous aerial communication system and the target aerial vehicle. Additionally, in the negotiation report communication message 436, the negotiation module may also request that an operator of the terrestrial support system entity (whether human, computer, or both) approve the results of the negotiation session before the aerial vehicle and/or the target aerial vehicle implement the resolution of the negotiation session in their respective operation.

In a further aspect, the negotiation report communication message 436 transmitted to the terrestrial support system entity by the negotiation module 226 may authorize the terrestrial support system entity to relay the content and resolution of the negotiation session in a finalized negotiation report communication message, as well as the entity's approval of the results of the negotiation session—if applicable, to the aerial vehicle 401 and/or the target aerial vehicle 403, a centralized database (e.g., through the entity's operation within a network), or other entities, for use by other entities in the entity's proximity, abroad, or both. Other message generation methods may also be utilized.

J. Other Example Embodiments

In a further aspect, although the illustrative autonomous aerial communications system components discussed above are discussed in terms of effectuating communication with at least one target aerial vehicle, nothing described in this illustrative embodiment should be construed to limit the application of this system to effectuating communication with aerial vehicles only. Instead, the illustrative system described above could also be used to effectuate communication with non-aerial vehicles (e.g., a related terrestrial support system entity, which may include a wholly or partially computer-automated air traffic control system, a manned air-traffic controller station, or both).

Figure 5:
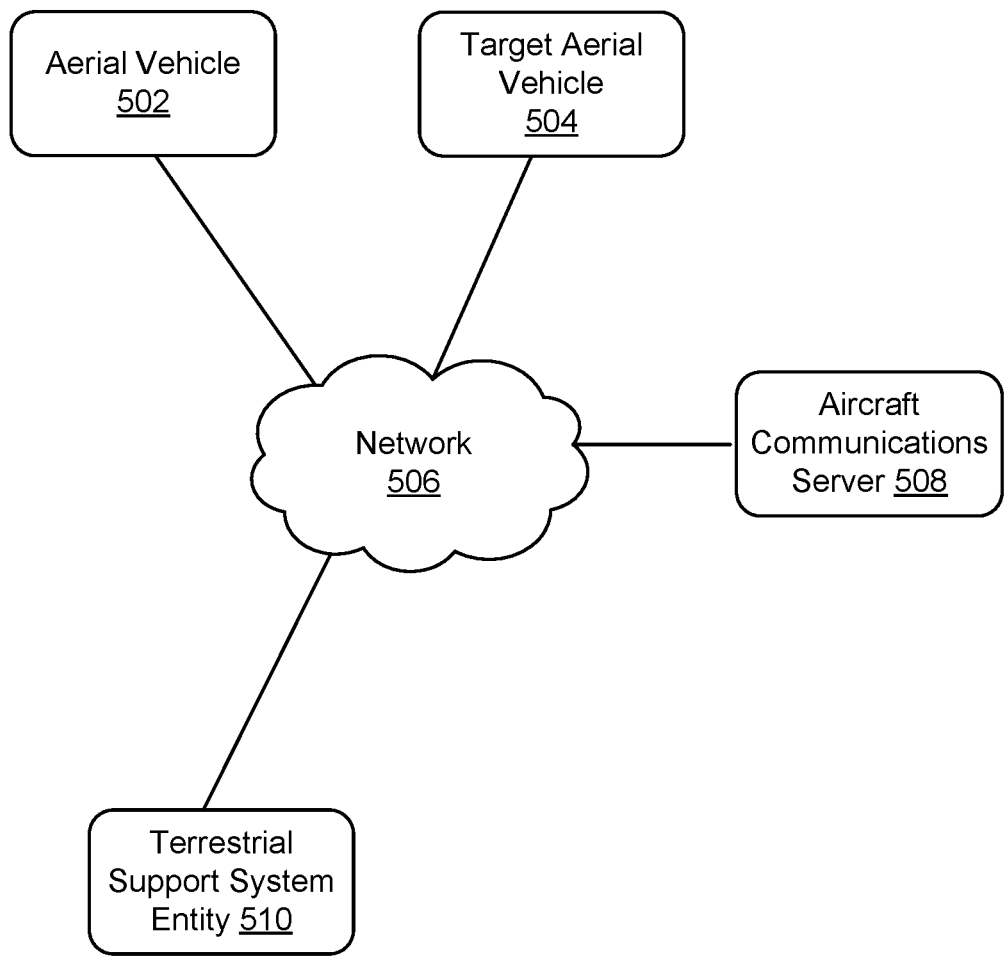
FIG. 5 depicts a distributed computing architecture, according to an example embodiment.

IV. Further Example Systems and Apparatus for Autonomous Aerial Communications Systems A. Communication Interfaces
Example Data Network FIG. 5 depicts data network 500 with aircraft communications server 508 configured to communicate, via network 506, with aerial vehicle 502, target aerial vehicle 504, and a terrestrial support system entity 510 in accordance with an example embodiment. Network 506 may correspond to a LAN, a wide area network (WAN), a corporate intranet, the public Internet, or any other type of network configured to provide a communications path between networked computing devices. Network 506 may also correspond to a combination of one or more LANs, WANs, corporate intranets, and/or the public Internet.

Although FIG. 5 only shows two aircraft, one terrestrial support system entity, and one aircraft communications server, data networks may serve tens, hundreds, or thousands of computing devices. Moreover, aerial vehicle 502, target aerial vehicle 504 (or any additional target aerial vehicles) can include one or more computing devices, such as computing device 200 described above.

Aircraft communications server 508 can be configured to generate and/or recognize aircraft communications using at least some of the techniques described herein. In particular, aircraft communications server 508 can generate and/or recognize voice and perhaps data communications involving one or more aircraft such as aerial vehicle 502, target aerial vehicle 504, and a terrestrial support system entity 510, and/or other entities involved in mechanized flight. In some embodiments, voice and perhaps data communications involving one or more aircraft can include compressed and/or uncompressed content and/or can include encrypted and/or unencrypted content. Other types of content are possible as well. Many other examples of server devices are possible as well.

B. Cloud-Based Servers

Figure 6:
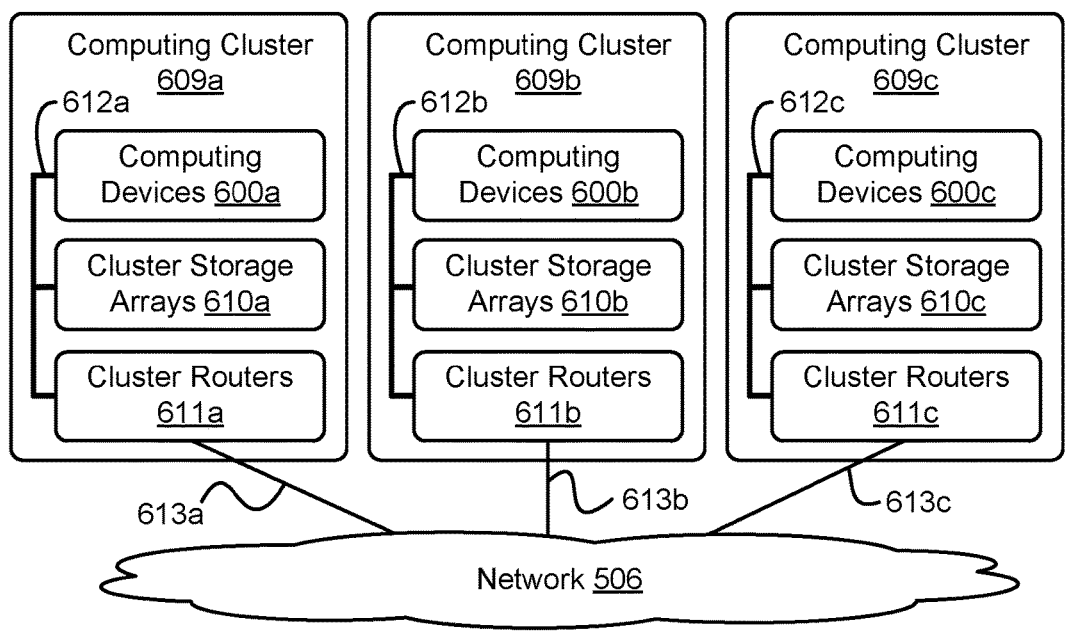
FIG. 6 depicts a network of computing clusters arranged as a cloud-based server system, according to an example embodiment.

FIG. 6 depicts a network 506 of computing clusters 609a, 609b, 609c arranged as a cloud-based server system in accordance with an example embodiment. Computing clusters 609a, 609b, 609c can be cloud-based devices that store program logic and/or data of cloud-based applications and/or services; e.g., perform at least one function of a software application, a software package, a runtime system, an application platform computing devices detailed in FIGS. 1, 2, 3, 4, and/or 5, and/or the method in FIG. 7.

In some embodiments, computing clusters 609a, 609b, 609c can be a single computing device residing in a single computing center. In other embodiments, computing clusters 609a, 609b, 609c can include multiple computing devices in a single computing center, or even multiple computing devices located in multiple computing centers located in diverse geographic locations. For example, FIG. 6 depicts each of computing clusters 609a, 609b, and 609c residing in different physical locations.

In some embodiments, data and services at computing clusters 609a, 609b, 609c can be encoded as computer readable information stored in non-transitory, tangible computer readable media (or computer readable storage media) and accessible by other computing devices. In some embodiments, computing clusters 609a, 609b, 609c can be stored on a single disk drive or other tangible storage media, or can be implemented on multiple disk drives or other tangible storage media located at one or more diverse geographic locations.

FIG. 6 depicts a cloud-based server system in accordance with an example embodiment. In FIG. 6, functionality of a software application, a software package, a runtime system, an application platform and/or a computing device can be distributed among computing clusters 609a, 609b, 609c. Computing cluster 609a can include one or more computing devices 600a, cluster storage arrays 610a, and cluster routers 611a connected by a local cluster network 612a. Similarly, computing cluster 609b can include one or more computing devices 600b, cluster storage arrays 610b, and cluster routers 611b connected by a local cluster network 612b. Likewise, computing cluster 609c can include one or more computing devices 600c, cluster storage arrays 610c, and cluster routers 611c connected by a local cluster network 612c.

In some embodiments, each of computing clusters 609a, 609b, and 609c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 609a, for example, computing devices 600a can be configured to perform various computing tasks of a software application, a software package, a runtime system, an application platform and/or a computing device. In one embodiment, the various functionalities of a software application, a software package, a runtime system, an application platform and/or a computing device can be distributed among one or more of computing devices 600a, 600b, 600c. Computing devices 600b and 600c in respective computing clusters 609b and 609c can be configured similarly to computing devices 600a in computing cluster 609a. On the other hand, in some embodiments, computing devices 600a, 600b, and 600c can be configured to perform different functions.

In some embodiments, computing tasks and stored data associated with a software application, a software package, a runtime system, an application platform and/or a computing device can be distributed across computing devices 600a, 600b, and 600c based at least in part on the processing requirements of a software application, a software package, a runtime system, an application platform and/or a computing device, the processing capabilities of computing devices 600a, 600b, 600c, the latency of the network links between the computing devices in each computing cluster and between the computing clusters themselves, and/or other factors that can contribute to the cost, speed, fault-tolerance, resiliency, efficiency, and/or other design goals of the overall system architecture.

Cluster storage arrays 610a, 610b, 610c of computing clusters 609a, 609b, 609c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a software application, a software package, a runtime system, an application platform and/or a computing device can be distributed across computing devices 600a, 600b, 600c of computing clusters 609a, 609b, 609c, various active portions and/or backup portions of these components can be distributed across cluster storage arrays 610a, 610b, 610c. For example, some cluster storage arrays can be configured to store one portion of the data of a software application, a software package, a runtime system, an application platform and/or a computing device, while other cluster storage arrays can store other portion(s) of data of a software application, a software package, a runtime system, an application platform and/or a computing device. Additionally, some cluster storage arrays can be configured to store backup versions of data stored in other cluster storage arrays.

Cluster routers 611a, 611b, 611c in computing clusters 609a, 609b, 609c can include networking equipment configured to provide internal and external communications for the computing clusters. For example, cluster routers 611a in computing cluster 609a can include one or more internet switching and routing devices configured to provide (i) local area network communications between computing devices 600a and cluster storage arrays 610a via local cluster network 612a, and (ii) wide area network communications between computing cluster 609a and computing clusters 609b and 609c via wide area network connection 613a to network 606. Cluster routers 611b and 611c can include network equipment similar to cluster routers 611a, and cluster routers 611b and 611c can perform similar networking functions for computing clusters 609b and 609b that cluster routers 611a perform for computing cluster 609a.

In some embodiments, the configuration of cluster routers 611a, 611b, 611c can be based at least in part on the data communication requirements of the computing devices and cluster storage arrays, the data communications capabilities of the network equipment in cluster routers 611a, 611b, 611c, the latency and throughput of local networks 612a, 612b, 612c, the latency, throughput, and cost of wide area network links 613a, 613b, 613c, and/or other factors that can contribute to the cost, speed, fault-tolerance, resiliency, efficiency and/or other design criteria of the moderation system architecture.

V. Example Methods of Operation

Figure 7:
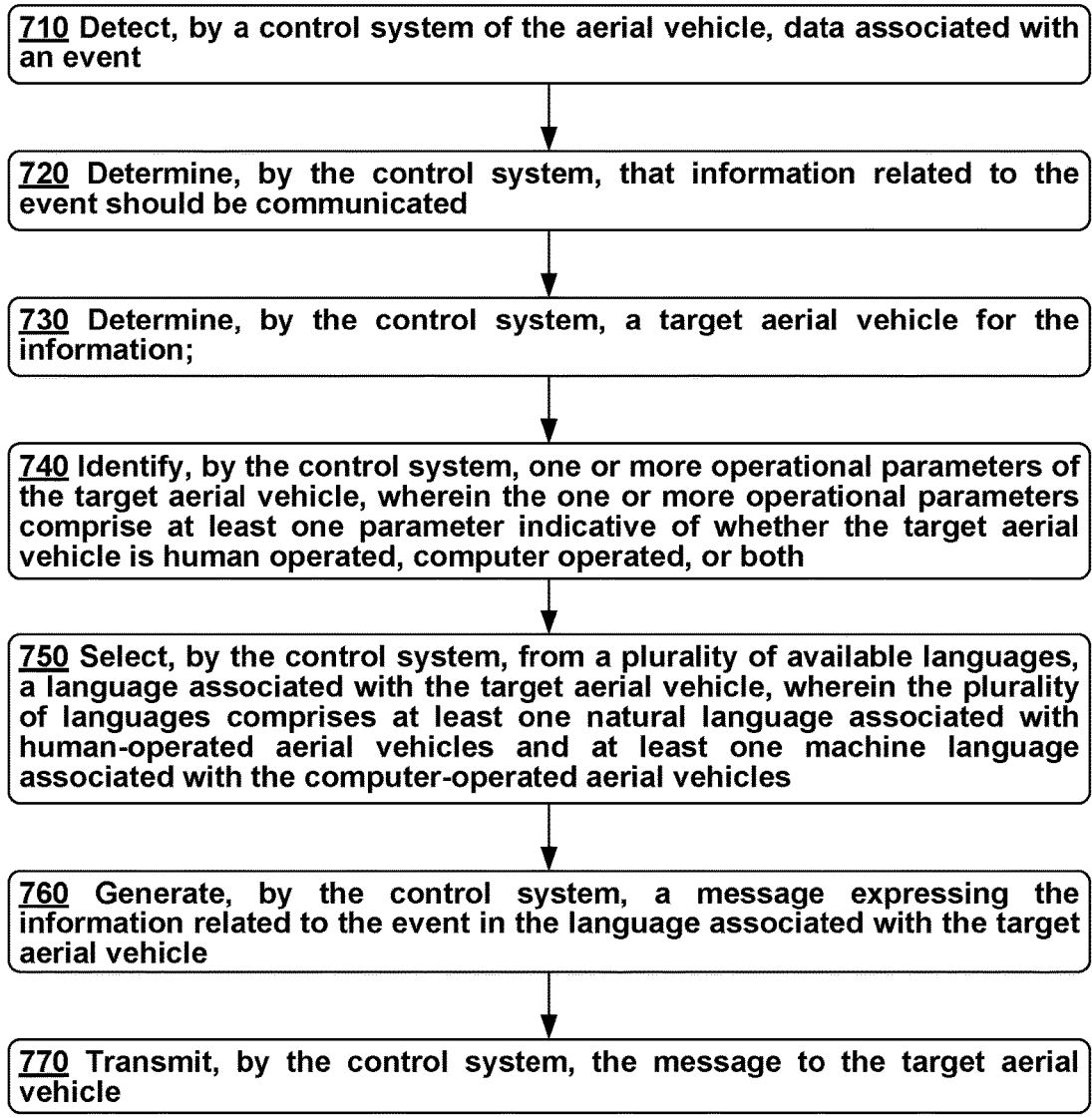
FIG. 7 is a flowchart of a method, according to an example embodiment.

FIG. 7 is a flowchart of method 700, in accordance with an example embodiment. Method 700 can be executed by a computing device, such as computing device 200. Method 700 can begin at block 710, where the control system can detect data associated with an event, such as discussed above at least in the context of FIG. 2. In some embodiments, the data associated with the event can comprise detecting, by the control system, data associated with at least one natural language or machine language input communication, such as discussed above at least in the context of FIG. 2. In other embodiments, the data associated with the input communication can comprise detecting, by the control system, data associated with flight management parameters of the aerial vehicle, the target aerial vehicles[s], or both, such as discussed above at least in the context of FIG. 2.

At block 720, the control system can determine that information related to the event should be communicated, such as discussed above at least in the context of FIGS. 2, 3, and 4. In some embodiments, determining the information can comprise determining, by the control system, [a] proposed flight path[s] for the aerial vehicle, the target aerial vehicle[s], or both, such as discussed above at least in the context of FIGS. 2 and 4.

At block 730, the control system can determine a target aerial vehicle for the information, such as discussed above at least in the context of FIGS. 2, 3, and 4. In some embodiments, determining the target aerial vehicle can comprise determining, by the control system, from a plurality of target aerial vehicles, at least one target aerial vehicle, and performing the identifying, selecting, generating, and transmitting steps for each target aerial vehicle of the plurality of target aerial vehicles, such as discussed above at least in the context of in the context of FIGS. 2, 3, and 4.

At block 740, the control system can identify one or more operational parameters of the target aerial vehicle, wherein the one or more operational parameters comprise at least one parameter indicative of whether the target aerial vehicle is human operated, computer operated, or both, such as discussed above at least in the context of FIGS. 1, 2, 3, and 4. In some embodiments, identifying one or more operational parameters of the target aerial vehicle can comprise identifying, by the control system, the operational parameters of the target aerial vehicle by referring to a repository of operational parameters which may be ascribed to a class of entities of which the target aerial vehicle may be a part, such as discussed above at least in the context of FIG. 2.

At block 750, the control system can select, from a plurality of available languages, a language associated with the target aerial vehicle, wherein the plurality of languages comprises at least one natural language associated with human-operated target aerial vehicles and at least one machine language associated with the computer-operated target aerial vehicles, such as discussed above at least in the context of FIGS. 1, 2, 3, and 4. For example, in some embodiments, the natural language associated with the one or more human-operated target aerial vehicles comprises at least one natural language from a set of multiple natural-language communication capabilities and the machine language associated with the computer-operated target aerial vehicles can comprise at least one computer language from a set of multiple computer-language communication capabilities.

At block 760, the control system can generate a message expressing the information related to the event in the language associated with the target aerial vehicle, such as discussed above at least in the context of FIGS. 1, 2, 3, and 4. In other embodiments, the message generated by the control system can comprise generating, by the control system, a message inviting one or more aerial vehicles to a negotiation session, such as discussed above at least in the context of FIGS. 2 and 4.

At block 770, the control system can transmit the message to the target aerial vehicle, such as discussed above at least in the context of FIGS. 1, 2, 3, and 4. In other embodiments, the message transmitted by the control system can comprise establishing, by the control system, a negotiation session with one or more target aerial vehicles to determine the acceptability of the proposed flight paths of the aerial vehicle, the target aerial vehicle[s], or both, such as discussed above at least in the context of FIGS. 2 and 4. In some embodiments, the entity approving the results of the negotiation session can be human operated, computer operated, or both, such as discussed above at least in the context of FIGS. 2 and 4. In a further aspect, the entity approving the results of the negotiation session, the parties to the negotiation session, or both, can transmit the content and/or resolution of the negotiation session to the parties to the negotiation session, a centralized database, or both, such as discussed above at least in the context of FIGS. 2 and 4.

In some embodiments, method 700 can further include that: the aerial vehicle is a legacy aerial vehicle, at least one of the target aerial vehicle[s] is a legacy aerial vehicle, or both; the aerial vehicle is a legacy aerial vehicle, at least one of the target aerial vehicle[s] is an unmanned aerial system, or both; the aerial vehicle is an unmanned aerial system, at least one of the target aerial vehicle[s] is a legacy aerial vehicle, or both; and/or the aerial vehicle is an unmanned aerial system, at least one of the target aerial vehicle[s] is an unmanned aerial system, or both, such as discussed above at least in the context of FIGS. 1, 2, 3, and 4.

FIG. 8 is a flowchart of method 800, in accordance with an example embodiment. Method 800 can be executed by a computing device, such as computing device 200. Method 800 can begin at block 810, where the control system can detect data associated with an event, such as discussed above at least in the context of FIG. 2. In some embodiments, the data associated with the event can comprise detecting, by the control system, data associated with an event indicating that communication with a related terrestrial support system entity, which may include a wholly or partially computer-automated air traffic control system, a manned air-traffic controller station, or both, is necessary. For example, this event may include the control system detecting data associated with a communication initiation request from the related terrestrial support system entity (e.g., a communication request from a human-operated air traffic control system). In other embodiments, this event may include the control system detecting data associated with a flight management parameters of the aerial vehicle, such as the class of an airspace in which the aerial vehicle is flying, the class of an airspace in which the aerial vehicle would prefer to fly, a need to request permission from the related terrestrial support system entity to transition between these airspaces, or some other related data associated with such events.

At block 820, the control system can determine that information related to the event should be communicated, such as discussed above at least in the context of FIGS. 2, 3, and 4.

At block 830, the control system can identify one or more operational parameters of the target recipient, wherein the one or more operational parameters comprise at least one parameter indicative of whether the target recipient is human operated, computer operated, or both, such as discussed above at least in the context of FIGS. 1, 2, 3, and 4.

At block 840, the control system can select, from a plurality of available languages, a language associated with the one or more identified operational parameters, wherein the plurality of languages comprises at least one natural language and at least one machine language, such as discussed above at least in the context of FIGS. 1, 2, 3, and 4.

At block 850, the control system can generate a message expressing the information related to the event in the selected language, such as discussed above at least in the context of FIGS. 1, 2, 3, and 4.

At block 860, the control system can transmit the generated message, such as discussed above at least in the context of FIGS. 1, 2, 3, and 4.

In some embodiments, method 800 can further include that: the target recipient is a terrestrial support system entity (which may include a wholly or partially computer-automated air traffic control system, a manned air-traffic controller station, or both), a legacy aerial vehicle, or an unmanned aerial system such as discussed above at least in the context of FIGS. 1, 2, 3, and 4.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

We claim:

1. A method for operating an unmanned aerial vehicle comprising:
   detecting, by a control system of the unmanned aerial vehicle, data associated with an event;
   determining, by the control system of the unmanned aerial vehicle, that information related to the event should be communicated;
   determining, by the control system of the unmanned aerial vehicle, a target aerial vehicle that is to receive the information;
   identifying, by the control system of the unmanned aerial vehicle, whether the target aerial vehicle is human operated or is unmanned;
   selecting, by the control system of the unmanned aerial vehicle, a natural language associated with human-operated target aerial vehicles if the target aerial vehicle is identified as human operated, or a machine language associated with unmanned aerial vehicles if the target aerial vehicle is identified as unmanned;

generating, by the control system of the unmanned aerial vehicle, a message expressing the information related to the event in the selected language; and transmitting, by the control system of the unmanned aerial vehicle, the message to the target aerial vehicle.

2. The method according to claim 1, wherein identifying, by the control system, whether the target aerial vehicle is human operated or unmanned comprises referring to a repository of operational parameters which may be ascribed to a class of entities of which the target aerial vehicle may be a part.

3. The method according to claim 1, wherein the natural language associated with the human-operated target aerial vehicle comprises at least one natural language from a set of multiple natural-language communication capabilities.

4. The method according to claim 1, wherein the machine language associated with the computer-operated target aerial vehicle comprises at least one computer language from a set of multiple computer-language communication capabilities.

5. The method according to claim 1, wherein determining the target aerial vehicle comprises determining, by the control system, from a plurality of target aerial vehicles, at least one target aerial vehicle.

6. The method according to claim 5, wherein detecting the data associated with the event comprises detecting, by the control system, data associated with at least one natural language or machine language input communication.

7. The method according to claim 6, wherein detecting the data associated with the input communication comprises detecting, by the control system, data associated with flight management parameters of the unmanned aerial vehicle, the target aerial vehicle, or both.

8. The method according to claim 7, wherein determining that the information related to the event should be communicated comprises determining, by the control system, a proposed flight path for the unmanned aerial vehicle, the target aerial vehicle, or both.

9. The method according to claim 8, wherein generating the message comprises generating, by the control system, a message inviting one or more aerial vehicles to a negotiation session, and wherein transmitting the message comprises establishing, by the control system, a negotiation session with one or more target aerial vehicles to determine the acceptability of the proposed flight paths of the unmanned aerial vehicle, the target aerial vehicle, or both.

10. The method according to claim 9, wherein the entity approving the results of the negotiation session is human operated, computer operated, or both.

11. The method according to claim 10, wherein the entity approving the results of the negotiation session, the parties to the negotiation session, or both, transmit the content and/or resolution of the negotiation session to the parties to the negotiation session, a centralized database, or other entities.

12. The method according to claim 9, wherein the target aerial vehicle includes at least one related terrestrial support system entity operating within a network, comprising a wholly or partially computer-automated air traffic control system, a human-operated air traffic controller station, or both.

13. The method according to claim 12, wherein the entity approving the results of the negotiation session is human operated, computer operated, or both.

14. The method according to claim 13, wherein the entity approving the results of the negotiation session, the parties to the negotiation session, or both, transmit the content and/or resolution of the negotiation session to the parties to the negotiation session, a centralized database, and/or other entities.

15. A system comprising:
at least one target aerial vehicle; and
at least one aerial vehicle with an autonomous aerial communications system, wherein the autonomous communications system comprises:
at least one interface for communication with other aerial vehicles;
and a control system configured to:
detect data associated with an event;
determine that information related to the event should be communicated;
determine the target aerial vehicle that is to receive the information;
identify whether the target aerial vehicle is human operated or is unmanned;
select, from a plurality of available languages, a natural language associated with human-operated target aerial vehicles if the target aerial vehicle is identified as human operated, or a machine language associated with unmanned aerial vehicles if the target aerial vehicle is identified as unmanned;
generate a message expressing the information related to the event in the selected language; and
transmit the message to the target aerial vehicle.

16. A non-transitory computer readable medium having stored therein instructions executable by one or more processors to cause a control system to perform functions comprising:
detecting data associated with an event;
determining that information related to the event should be communicated;
determining a target aerial vehicle that is to receive the information;
identifying whether the target aerial vehicle is human operated or is unmanned;
selecting a natural language associated with human-operated target aerial vehicles if the target aerial vehicle is identified as human operated, or a machine language associated with unmanned aerial vehicles if the target aerial vehicle is identified as unmanned;
generating a message expressing the information related to the event in the selected language; and
transmitting the message to the target aerial vehicle.

17. A method for operating an aerial vehicle comprising:
detecting, by a control system of the aerial vehicle, data associated with an event; determining, by the control system, that information related to the event should be communicated;
identifying, by the control system, one or more operational parameters of a target recipient, wherein the one or more operational parameters comprise at least one parameter indicative of whether the target recipient is human operated, computer operated, or both;
selecting, by the control system, from a plurality of available languages, one or more languages associated with the one or more identified operational parameters, wherein the plurality of languages comprises at least one natural language and at least one machine language;
generating, by the control system, a message expressing the information related to the event in the selected language; and transmitting, by the control system, the generated message.

18. The method according to claim 17, wherein the one or operational parameters are associated with a wholly or partially computer-automated air traffic control system, a human-operated air traffic controller station, or both.

19. The method according to claim 17, wherein the one or operational parameters are associated with a legacy aerial vehicle.

20. The method according to claim 17, wherein the one or operational parameters are associated with an unmanned aerial system.

* * * * *